United States Patent
Chen et al.

(10) Patent No.: US 9,153,814 B2
(45) Date of Patent: Oct. 6, 2015

(54) MESOPOROUS STARBURST CARBON INCORPORATED WITH METAL NANOCRYSTALS OR METAL OXIDE NANOCRYSTALS, AND USES THEREOF

(71) Applicant: Toyota Motor Engineering & Manufacturing North America, Inc., Erlanger, KY (US)

(72) Inventors: Jiajun Chen, Ann Arbor, MI (US); Kazuhisa Yano, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 106 days.

(21) Appl. No.: 13/720,463

(22) Filed: Dec. 19, 2012

(65) Prior Publication Data

US 2014/0170491 A1 Jun. 19, 2014

(51) Int. Cl.
| | |
|---|---|
| *H01M 4/133* | (2010.01) |
| *H01M 4/131* | (2010.01) |
| *H01M 4/485* | (2010.01) |
| *H01M 4/525* | (2010.01) |
| *H01M 4/38* | (2006.01) |
| *H01M 4/36* | (2006.01) |
| *H01M 4/62* | (2006.01) |
| *H01M 10/052* | (2010.01) |
| *H01M 4/02* | (2006.01) |

(52) U.S. Cl.
CPC .............. *H01M 4/131* (2013.01); *H01M 4/387* (2013.01); *H01M 4/485* (2013.01); *H01M 4/525* (2013.01); *H01M 4/625* (2013.01); *H01M 4/366* (2013.01); *H01M 4/623* (2013.01); *H01M 10/052* (2013.01); *H01M 2004/021* (2013.01); *Y02E 60/122* (2013.01)

(58) Field of Classification Search
CPC ..... H01M 4/133; H01M 4/387; H01M 4/485; H01M 4/525
USPC ........................................................ 429/217
See application file for complete search history.

(56) References Cited

U.S. PATENT DOCUMENTS

| 5,990,041 | A | * | 11/1999 | Chung et al. | ................. 502/416 |
| 7,724,500 | B2 | | 5/2010 | Long et al. | |
| 2004/0047798 | A1 | * | 3/2004 | Oh et al. | ...................... 423/414 |
| 2011/0297889 | A1 | | 12/2011 | Plee et al. | |
| 2012/0074908 | A1 | | 3/2012 | Rolison et al. | |

OTHER PUBLICATIONS

Ji et al. (Chem. Mater., vol. 19, No. 3, 2007 pp. 374-383).*

(Continued)

*Primary Examiner* — Stewart Fraser
*Assistant Examiner* — Olatunji Godo
(74) *Attorney, Agent, or Firm* — Christopher G. Darrow; Darrow Mustafa PC

(57) ABSTRACT

A composition is provided that includes mesoporous starburst carbon domains. Each of the mesoporous starburst carbon domains is incorporated with particles of metal or metal oxide in an amount of from 40 to 85 total weight percent of the composition. The metal or metal oxide particles can include tin, cobalt, copper, molybdenum, nickel, iron, or ruthenium, or an oxide thereof. The resulting composition when combined with a binder forms a battery electrode. Such a battery electrode operating as an anode in a lithium ion battery has gravimetric capacity of more than 1000 milliampere hours per gram after 15 galvanostatic cycles.

22 Claims, 2 Drawing Sheets

(56) References Cited

OTHER PUBLICATIONS

Tatsuda et al. (Chem. Mater., vol. 21, No. 21, 2009, pp. 5252-5257).*
Su et al. (J. Phys. Chem. B, vol. 109, No. 43, 2005 pp. 20200-20206).*
Han et al., "Coating Single-Walled Carbon Nanotubes with Tin Oxide", Nano Lett, vol. 3, No. 5, 2003, pp. 681-683.
Nakamura et al., Monodispersed nanoporous starburst carbon spheres and their three-dimensionally ordered arrays, Toyota Central R&D Labs., Inc., Nagakute, Aichi 480-1192, Japan.
Tatsuda et al., Synthesis of Highly Monodispersed Mesoporous Tin Oxide Spheres, Toyota Central Research & Development Laboratories, Incorporated, Nagakute, Aichi 480-1192, Japan, and Department of Applied Chemistry, Graduate School of Urban Environmental Sciences, Tokyo Metropolitan University, 1-1 minami-Osawa, Hachioji, Tokyo, 192-0397 (Japan).
Egashira et al, "Properties of containing Sn nanoparticles activated carbon fiber for a negative electrode in lithium batteries", Institute of Advanced Materials Study, Kyushu University, 6-1 Kasuga-Koen, Kasuga, Fukuoka 816-8580, Japan, Journal of Power Sources 107 (2002) 56-60.
Luo et al, "Graphene-Confined Sn Nanosheets with Enhanced Lithium Storage Capability", Advanced Materials 2012, 24, pp. 3538-3543.
Fan et al., "Characterization of Amorphous and Crystalline Tin—Cobalt Anodes", Electrochemical and Solid-State Letters 2007, vol. 10, Issue 12, pp. A274-A278.
Idota et al., "Tin-Based Amorphous Oxide: A High-Capacity Lithium-Ion-Storage Material", Science 1997, 276(5317), pp. 1395-1397.
Kim et al, "Critical Size of a Nano $SnO_2$ Electrode for Li-Secondary Battery", Chem. Mater. 2005, 17, pp. 3297-3301.
Yang et al., "Anodes for lithium batteries: tin revisited", Electrochemistry Communications 5 (2003) pp. 587-590.
Ryoo et al., "Synthesis of Highly Ordered Carbon Molecular Sieves via Template-Mediated Structural Transformation", The Journal of Physical Chemistry B, Vo. 103, No. 37, Sep. 16, 1999, pp. 7743-7746.
Lee et al., "Synthesis of a new mesoporous carbon and its application to electrochemical double-layer capacitors", Chem. Commun., 1999, pp. 2177-2218.
Kyotani et al., "Formation of New Type of Porous Carbon by Carbonization in Zeolite Nanochannels" Chem. Mater. 9 (1997) pp. 609-615.
Ma et al., "Preparation of a high surface area microporous carbon having the structural regularity of Y zeolite", Chem. Commun. (2000) pp. 2365-2366.
Jun et al., "Synthesis of New, Nanoporous Carbon with Hexagonally Ordered Mesostructure" JACS 122 (2000) pp. 10712-10713.
Demir-Cakan et al., "Facile One-Pot Synthesis of Mesoporous $SnO_2$ Microspheres via Nanoparticles Assembly and Lithium Storage Properties", Chem. Mater. 2008, 20, pp. 1227-1229.
Huang et al., "In Situ Observation of the Electrochemical Lithiation of a Single $SnO_2$ Nanowire Electrode", Science vol. 330 Dec. 10, 2010 pp. 1515-1520.
Luo et al, "Reduced Graphene Oxide-Mediated Growth of Uniform Tin-Core/Carbon-Sheath Coaxial Nanocable with Enhanced Lithium Ion Storage Properties", Advanced Materials 2012, 24, pp. 1405-1409.
Grigoriants et al. "The use of tin-decorated mesoporous carbon as an anode material for rechargeable lithium batteries", Jan. 5, 2015, pp. 921-923.

* cited by examiner

MESOPOROUS STARBURST CARBON INCORPORATED WITH METAL NANOCRYSTALS OR METAL OXIDE NANOCRYSTALS, AND USES THEREOF

TECHNICAL FIELD

The present invention relates in general to a composition of matter composed of mesoporous starburst carbon domains having particles of metal or metal oxides incorporated therethrough at amounts of greater than 40 weight percent of the total composition, and in particular to the use of such a composition as a high energy density battery electrode.

BACKGROUND OF THE INVENTION

The ability to develop a high efficiency lithium battery has been met with limited success owing in large part to low capacity, as measured in milliampere hours per gram (mAh/g), as well as a dramatic decrease in capacity with battery cycling. A prototypical anode for many lithium ion batteries is conventional graphite with a theoretical gravimetric capacity of 372 mAh/g. In response to these limitations, the prior art has explored metallic and metal oxide based anodes as a replacement for graphite. Such anodes typically have theoretical gravimetric capacities much greater than that of graphite. By way of example, tin has a theoretical gravimetric capacity of about 960 mAh/g. Tin oxide has a theoretical gravimetric capacity of 1491 mAh/g. Unfortunately, metal and metal oxide based lithium ion battery electrodes suffer from large volume changes with lithium intercalation/deintercalation that rapidly fragment the electrode with cycling. Electrode fragmentation also referred to herein as decrepitation increases overall cell impedance. As a result, bulk tin foil can only be cycled at 600 mAh/g for only about 15 cycles before a dramatic decrease in operating performance. S. Yang et al. *Electrochem. Commun.* 2003, 5(7), 587-590. In order to address bulk material decrepitation, nanostructures and nanocomposites have been extensively investigated to address volumetric changes during electrochemical cycling.

In order to overcome decrepitation problems associated with bulk tin, various composite systems have been evaluated. These systems illustratively include tin dispersed in carbon matrices (M. Egashira et al., *J. Power Sources,* 2002, 107(1), 56-60); tin-core/carbon-sheath coaxial nanocables (B. Luo et al, *Adv. Mater.* 2012, 24(11), 1405-1409); dual metal alloy nanoparticles encapsulated in carbon (Q. Fan et al. *Electrochem. Solid-state Lett.* 2007 10(12) A274-A278); tin-secondary metal oxides (Y. Idota et al., *Science* 1997, 276(5317), 1395-1397); tin oxide nanoparticles (C. Kim et al., *Chem. Mater.* 2005 17(12), 1397-3301); and other reduced domain size tin oxide halo structures, nanotubes, nanowires, and nanosheets. While these prior art records have shown progress in increasing gravimetric capacity to between 400 and 700 mAh/g over 15 cycles, these systems have required high carbon contents of greater than 40 percent by weight carbon in order to achieve improved capacity and at the expense of a lower theoretical gravimetric capacity than could be achieved with lower amounts of carbon materials.

Thus, there exists a need for a composition with a higher gravimetric capacity than conventional electrode materials. There further exists a need for a process for forming such a composition into a battery electrode.

SUMMARY

A composition is provided that includes mesoporous starburst carbon domains. Each of the mesoporous starburst carbon domains is incorporated with particles of metal or metal oxide in an amount of from 40 to 85 total weight percent of the composition. The metal or metal oxide particles can include tin, cobalt, copper, molybdenum, nickel, iron, or ruthenium, or an oxide thereof. The resulting composition when combined with a binder forms a battery electrode. Such a battery electrode operating as an anode in a lithium ion battery has gravimetric capacity of more than 1000 milliampere hours per gram after 15 of the voltage cycles.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1:
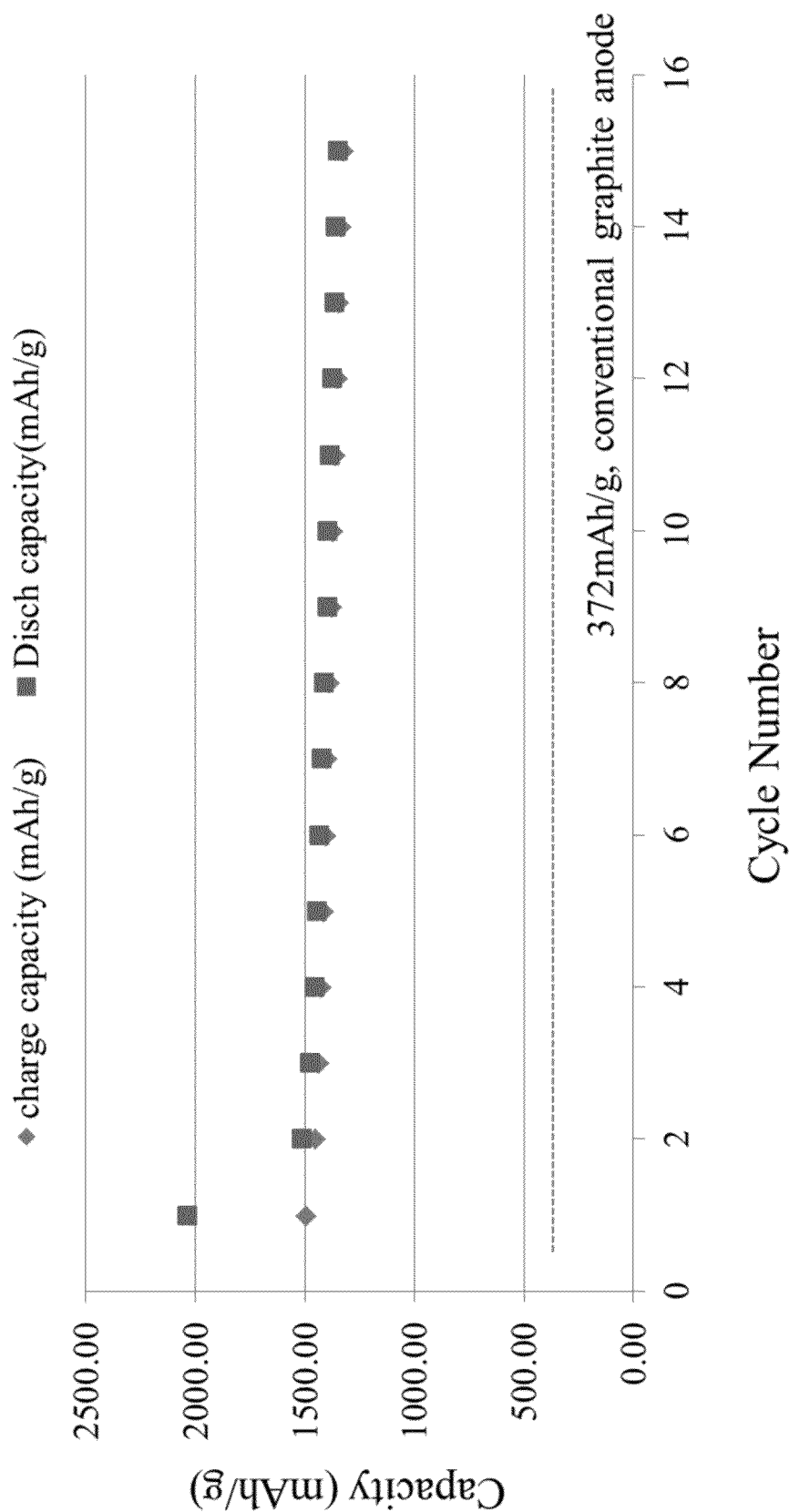
FIG. 1 is a plot of gravimetric capacity as a function of cycle number in an inventive composition through 15 charge/discharge cycles with the gravimetric capacity for a conventional graphite anode provided for comparison as a dashed line.

The present invention has utility as a battery electrode that surprisingly has gravimetric energy densities even after 15 discharge cycles that remain above those previously obtained by the prior art. In specific inventive embodiments, gravimetric capacity or specific capacity, synonymously referred to herein as capacity, above 1,000 mAh/g is obtained. An inventive electrode is based on mesoporous starburst carbon domains that are incorporated with particles of metal, metal oxide, or a combination thereof such that the incorporated particles constitute between 40 and 85 weight percent of the resultant composition. The particles are formed in-situ in certain inventive embodiments while in other inventive embodiments the particles are formed external to the mesoporous starburst carbon domains and diffused into the domains. With resort to a binder, the particle-incorporated mesoporous starburst carbon domains are readily joined to form a battery electrode of a desired shape and size.

It should be understood that in instances where a range of values are provided, the range is intended to encompass not only the end point values of the range but also intermediate values of the range are explicitly included within the range varying by the last significant figure of the range. By way of example, a recited range of from 1 to 4 is intended to include 1-2, 1-3, 2-4, 3-4, and 1-4.

As used herein, the term maximal linear extent is intended to define a longest linear dimension for a domain or particle from among three orthogonal axes, x-y-z. It should be appreciated that a spherical domain or particle has equal maximal linear dimensions along all three axes x-y-z and as a result an aspect ratio between the maximal linear extent and the related minimal linear extent of 1:1.

An inventive composition having a mesoporous starburst carbon domain may be readily produced in a variety of shapes illustratively including rods, plates, spheres, and prolate spheroid shapes. Mesoporous starburst carbon domains may be routinely synthesized through a nanocasting process using a suitable mesoporous template formed of silica or zeolite. Such techniques are well known to the art as exemplified in R. Ryoo et al., *J. Phys. Chem. B* 103 (1999) 7743; J. Lee et al.,

*Chem. Commun.* (1999) 2177; S. Jun et al., *JAGS* 122 (2000) 10,712; T. Kyotani et al., *Chem. Mater.* 9 (1997) 609; and Z. X. Ma et al., *Chem. Commun.* (2000) 2365; T. Nakamura et al., *Micropourous and Mesoporous Materials* 117 (2009) 478. Mesoporous starburst carbon domains as detailed herein may be characterized by high surface areas as measured by gas adsorption according to Brunauer-Emmett-Teller methodology; with surface areas routinely over 100 $m^2/g$; 600 $m^2/g$ in certain embodiments; and in some embodiments over 1,000 $m^2/g$ while in still other embodiments surface areas approach 1,300 $m^2/g$. Typical pore sizes for such mesoporous starburst carbon domains range between 1.0 nm and 10 nm. It is appreciated that the overall dimensions and maximal linear extent of a mesoporous starburst carbon domain is limited only by the template used for domain formation. Typical, non-limiting sizes of mesoporous starburst carbon domains operative herein extend from 0.1 to 2 microns for spherical domains. Where desired or required, the mesoporous starburst carbon domains can comprise nanorods and can be spherical.

The ability to produce mesoporous starburst carbon domains with the aforementioned high surface areas and controlled pore size is exploited herein to produce a composition with a loading of particles of metal, metal oxide, or a combination thereof in a range of 40 to 85 percent by weight so as to achieve battery electrodes with exceptional gravimetric and volumetric energy densities relative to conventional battery electrodes. To facilitate incorporation of such particles into a mesoporous starburst carbon domain, reagents for in situ particle synthesis or preformed nanocrystallite particles of the metal or metal oxide are drawn to the pore structure of the mesoporous starburst carbon domains. The incorporated particles have particle linear domain sizes that are controlled by pore dimensions in the case of particles synthesized in situ, or by diffusional limits in the case of preformed particles.

Without intending to be bound to a particular theory, it is believed that the solution-based particle synthesis or diffusion of preformed particles into the mesoporous starburst carbon domains is facilitated by capillary draw forces into pore channels of the mesoporous starburst carbon domains. It is appreciated that a mesoporous starburst carbon domain incorporated with particles of metal, or metal oxide, is synthesized with a coating of such particles on the exterior surface of the mesoporous starburst carbon domain. Such surface coated mesoporous starburst carbon domains are intended to be encompassed in the invention compositions.

It is appreciated that particles bound to the exterior surface of mesoporous starburst carbon domains are readily removed through preferential reactivity of exterior surface-bound particles with preferential removal through photolysis, mechanical abrasion, solvation, or a combination thereof. It is appreciated that modifications to surface properties of the disclosed particle-incorporated mesoporous starburst carbon domains—including properties like size, shape, uniformity of size or shape, and metal loading—can be made to adjust the optical and electrical properties of the particle-incorporated domains. For example, in certain inventive embodiments where the mesoporous starburst carbon domains have a particularly high degree of uniformity (i.e., are monodisperse), the particle-incorporated domains self-assemble into colloidal crystals.

Mesoporous starburst carbon domains incorporated with metals and/or metal oxides according to the present invention, when the metals and/or metal oxides are present in amounts of between 40 and 85 total weight percent of the combination of mesoporous starburst carbon domain and particles, are well-suited for the construction of a battery electrode with high gravimetric capacity and inhibition of decrepitation. In certain specific embodiments, it is contemplated that the particles such as tin oxide can be present from 75 to 85 total weight percent of the composition. The mesoporous starburst carbon domains can be monodisperse.

Particles operative herein for the formation of an electrode may be selected from a variety of metals and/or metal oxides. These metals and/or metal oxides illustratively may include the main group metal of tin; main group oxide of tin oxide; transition metals of cobalt, copper, molybdenum, nickel, iron, ruthenium, and combinations thereof; transition metal oxides of $CoO$, $Co_3O_4$, $CuO$, $Cu_2O$, $MoO_3$, $NiO$, $FeO$, $Fe_2O_3$, $Fe_3O_4$, $RuO_2$, and combinations thereof. It is appreciated that with voltage cycling of such metals and/or metal oxides within a lithium ion battery cell, one or more reversible conversion reactions can occur involving lithium metal, lithium ions, and the particles of metals or metal oxides. Typical particle sizes for metals or metal oxides used herein have a maximal linear extent of between 2 and 15 nm for those particles incorporated into the volume of a mesoporous starburst carbon domain while those particles on mesoporous starburst carbon domain surface are unrestrained by mesoporous starburst carbon domain dimensions and are therefore free to grow to larger maximal linear extents. In the majority of embodiments of the present invention, particles of metal or metal oxide within the mesoporous starburst carbon domains typically are spherical in shape and have a degree of crystallinity. Such particles are present at a high weight loading percentages of between 40 and 85 percent of the combined mesoporous starburst carbon domain-particle structure. In some embodiments, contacts between contiguous particles form extended particle aggregates having a fractal-like appearance characterized by non-integer dimensionalities of greater than one and less than three. It is appreciated that particles of an inventive composition are readily used that have aspect ratios greater than 1:1 and includes rods and other particle shapes that have aspect ratios greater than 1:1 and less than 10:1. In some implementations, the particles can have an aspect ratio of between 1:1 and 3:1, inclusive.

Particles of metal or metal oxide are readily synthesized in situ within mesoporous starburst carbon domains through a variety of techniques that include solution impregnation of the mesoporous starburst carbon domains with a metal salt solution or organometallics. Upon solvent removal, oxidation or reduction yields metal oxides and metals, respectively. In order to achieve high loadings of particles within a mesoporous starburst carbon domain according to the present invention, the metal ion-containing reagents noted above are used at high concentrations, typically approaching the solubility limits of the specific reagent within the solvent system employed. Typical in particular embodiments of the present invention, such reagents are used in amounts of between 1% and 100% of the solubility limit for that reagent under exposure conditions to the mesoporous starburst carbon domains. Typical solvents for incorporating particle free agents into mesoporous starburst carbon domains include water; low molecular weight alcohols illustratively including methanol, ethanol, isopropanol, furfuryl alcohol; ketones such as acetone, methyl ethyl ketone, and methyl butyl ketone; and hydrocarbons, including aromatics. It is appreciated that the solvent is chosen for ability to wet the pore surfaces of the mesoporous starburst carbon domains, as well as to dissolve precursors. It is appreciated that water is a particularly well-suited solvent as numerous metal ion salts are soluble therein at high concentrations. It is also appreciated that the ability of a reagent solution to wet pores of a mesoporous starburst carbon domain can be readily modified through pH modification.

In other embodiments, mesoporous starburst carbon domains are incorporated with previously synthesized particles of metal or metal oxide by exposure of mesoporous starburst carbon domains to either sols or solutions of such particles for a time sufficient to allow the particles to diffuse into the pore structure of the mesoporous starburst carbon domains. It is appreciated that such particles can be present as a colloidal suspension or as a solution with surface passivating groups on the particle surface to impart solubility to the particle. A technique for sol incorporation of tin oxide nanocrystals is conventional to the art. R. Demir-Cakan et al., *Chem. Mater.* 20 (2008) (1227).

Regardless of the method of introducing particle precursors into the volume of mesoporous starburst carbon domains, oxidation to form metal oxides in many instances readily occurs through exposure to ambient air during or subsequent to introduction. Alternatively, metal precursors are reduced to form metal particles through exposure to reductive conditions introduced chemically through the inclusion of substances such as $LiAlH_4$ or $BAlH_4$, or other soluble reducing agents, or exposure to a reducing atmosphere.

Upon producing a composition including mesoporous starburst carbon domains incorporated with metal or metal oxide particles, or a combination thereof, where the particles constitute between 40 and 95 percent of the composition, a battery electrode is readily formed by mixing a polymeric binder with the particle-incorporated domains, and subsequently forming the mixture into a desired electrode. It is appreciated that the resulting electrode may be readily formed in various forms and thicknesses depending on the desired parameters; such an electrode is readily formed as a solid rod, pole, a sheet, perforated web, or other such desired forms. Binder substances operative herein illustratively include polyvinyl pyrrolidone (PVP), polyvinylidene fluoride (PVDF), styrene-butadiene rubber (SBR), polyvinyl acetate (PVAc), and combinations thereof. It is appreciated that in some embodiments, a binder may be dissolved or suspended in a solvent to reduce viscosity and promote rapid mixing of the binder with particle-incorporated mesoporous starburst carbon domains.

It is appreciated that an electrode provided according to the present invention may be particularly well suited as an anode for a lithium battery. By way of example, mesoporous starburst carbon domains having a maximal linear extent of 860 nm as spherical domains and a tin oxide loading totaling 80% of the combined domain-particle weight, and a mean oxide domain size of 2.1 nm as determined by X-ray powder diffraction line broadening achieves current capacities of more than 1,200 mAh/g even after 15 galvanostatic cycles. Inventive battery electrodes are obtained that attain between 80 and 99 percent of the theoretical gravimetric capacity for the electrode composition for voltage cycles after the first cycle. The ability to cycle an inventive electrode 15 galvanostatic cycles while achieving such a high percentage of theoretical gravimetric capacity is indicative of an electrode structure that does not experience the decrepitation common to prior art electrodes having carbon domains with incorporated particles.

The present invention is further illustrated with respect to the following examples. It needs to be understood that these examples are provided to illustrate specific embodiments of the present invention and should not be construed as limiting the scope of the present invention.

Example 1

Figure 2:
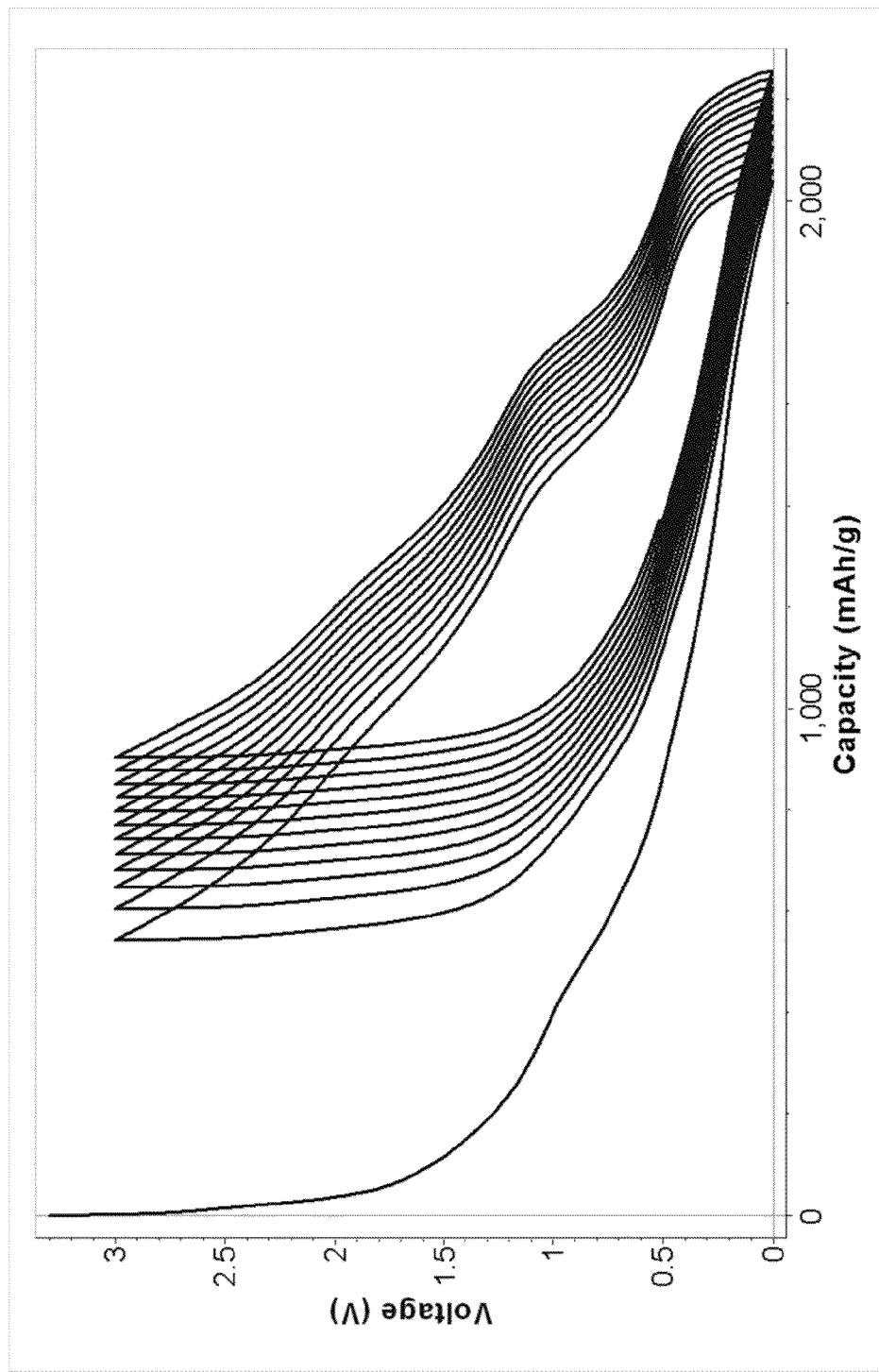
FIG. 2 is a plot of voltage as a function of gravimetric capacity (charge and discharge profiles) for an inventive composition through 15 charge/discharge cycles showing a less than 25% first irreversible capacity loss.

Spherical, monodisperse mesoporous starburst carbon domains are synthesized having a particle size of 860 nm, a pore volume of 0.84 liters per gram, a specific surface area of 1,560 $m^2/g$ and a pore size of 1.8 nm are synthesized by conventional technique. T. Nakamura et al., *Micropourous Mesoporous Mater.* 117 (2009) 478. 100 mg of such mesoporous starburst carbon domains are dispersed in 250 mL of distilled water containing 4 mL of concentrated HCl and 5 g of tin (II) chloride. After stirring for 3 hours at room temperature, followed by filtration and distilled water rinsing, a dry powder was obtained that is 79±0.4 weight percent tin oxides as determined by combustion and thread detection of mesoporous carbon content. The tin oxide particles have a mean particle size of 5 nm. The resulting tin oxide incorporated mesoporous starburst carbon domains are mixed with PVDF dissolved in N-Methyl-2-pyrrolidone (NMP) solvent to obtain a mixture that, upon solvent removal, is 80% particle-incorporated mesoporous starburst carbon domains, 10% conductive carbon black by weight, and 10% PVDF by weight. The mixture is formed into an electrode of a coin-type half-cell 2032-type as a 25 or 75 μm thick film on a copper foil backing. Typical loading is about 3 $mg/cm^2$ or 9 $mg/cm^2$, respectively. One molar $LiPF_6$ with 1:1 ethylene carbonate/diethylene carbonate (EC/DEC) is used for voltage cycling from 50-2000 mV or 5-3000 mV (versus $Li^+/Li$). A plot of gravimetric capacity as a function of cycle number is provided in FIG. 1 in which high reversible gravimetric capacity above 1,000 mAh/g exists even after 15 galvanostatic cycles. A coulombic efficiency of greater than 99% is noted for each voltage cycle after the first cycle and the observed gravimetric capacity is 95% of the theoretical gravimetric capacity for such a composition. In FIG. 1, gravimetric capacity values during battery charge are noted as filled diamonds while gravimetric capacity values during battery discharge are noted as filled squares. The gravimetric capacity of a normalized conventional graphite anode having a constant gravimetric capacity value of 372 mAh/g is depicted as a dashed line in FIG. 1 for comparison. A charge/discharge curve of a composition corresponding to the composition tested in FIG. 1 is shown in FIG. 2 in which it is noted that irreversible capacity loss associated with the first cycle is less than 25%.

Example 2

The process of example 1 is repeated with the exception that the amount of tin (II) chloride is increased to 20 g to achieve a loading of 85 weight percent tin oxide in the mesoporous spherical carbon domains. Similar electrode performance is noted to that provided with respect to Example 1.

Example 3

The process of Example 1 is performed with a molar equivalent of iron (III) substituted for tin chloride. The resulting electrode has a gravimetric capacity that is more than 95% of the theoretical gravimetric capacity for such an electrode.

Example 4

The process of Example 1 is performed with a molar equivalent of nickel (II) substituted for tin chloride. The resulting electrode has a gravimetric capacity that is more than 81% of the theoretical gravimetric capacity for such an electrode.

Example 5

The process of Example 1 is performed with a molar equivalent of cobalt (II) substituted for tin chloride. The resulting electrode has a gravimetric capacity that is more than 74% of the theoretical gravimetric capacity for such an electrode.

Example 6

The process of Example 1 is performed with a molar equivalent of molybdenum (VI) substituted for tin chloride. The resulting electrode has a gravimetric capacity that is more than 83% of the theoretical gravimetric capacity for such an electrode.

Example 7

The process of Example 1 is repeated with the addition of using the tin oxide incorporated with mesoporous spherical starburst carbon domains in a vacuum oven having an atmosphere of 10% hydrogen and nitrogen after 16 hours at 250° C., carbon domains are noted to be filled with metallic tin nanocrystals.

Example 8

The process of Example 7 is repeated with the exception that an equal molar amount of iron (III) is substituted for tin chloride to produce metallic iron nanocrystals.

Example 9

The process of Example 7 is repeated with the exception that an equal molar amount of nickel (II) is substituted for tin chloride to produce metallic nickel nanocrystals.

References cited in the invention specification are indicative of the skill in the art at the time of the invention. These references are specifically individually incorporated herein by reference to the same extent as if each individual reference was individually incorporated herein by reference.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appending claims, each scope is to be afforded the broadest interpretation as to encompass all such modifications and equivalent structures as is permitted under the law.

The invention claimed is:

1. An electrode comprising:
a plurality of mesoporous starburst carbon domains, having a surface area of greater than 1,000 square meters per gram ($m^2/g$);
each domain of said plurality of mesoporous starburst carbon domains incorporated with particles of metal or metal oxide comprising at least one of tin, cobalt, copper, molybdenum, nickel, iron, or ruthenium, or an oxide thereof, said particles being present at a weight loading percentage of between 40 and 85 percent of a combined mesoporous starburst carbon domain-particle structure.

2. The electrode of claim 1 wherein said each domain of said plurality of mesoporous starburst carbon domains is spherical and comprises carbon nanorods.

3. The electrode of claim 2 wherein said plurality of mesoporous starburst carbon domains is monodisperse.

4. The electrode of claim 1 wherein said particles of metal or metal oxide decorate an external surface of one of said plurality of mesoporous starburst carbon domains.

5. The electrode of claim 1 wherein said particles comprise tin oxide.

6. The electrode of claim 5 wherein said particles of tin oxide are present at a weight loading percentage of between 75 and 85 percent of a combined mesoporous starburst carbon domain-particle structure.

7. The electrode of claim 1 wherein said particles comprise tin.

8. The electrode of claim 1 wherein said particles comprise cobalt oxide.

9. The electrode of claim 1 wherein said particles comprise iron oxide.

10. The electrode of claim 1 wherein said particles have a maximal linear extent of between 2 and 15 nm and an aspect ratio of between 1:1 and 3:1 inclusive.

11. A battery electrode having particle-incorporated carbon domains, the particle-incorporated carbon domains comprising:
mesoporous starburst carbon domains; and
particles of metal, metal oxide, or a combination thereof incorporated into the mesoporous starburst carbon domains,
wherein the particles are present at between 40 and 85 weight percent of the particle-incorporated carbon domains, and wherein the battery electrode has reversible gravimetric capacity of at least 1000 milliampere hours per gram (mAh/g).

12. A process of operating a battery electrode comprising:
placing the battery electrode of claim 1 in an electrolyte containing lithium ions;
forming an electrical circuit including the battery electrode; and
applying voltage cycles to the battery electrode to achieve a capacity of more than 800 milliampere hours per gram (mAh/g) after 15 of the voltage cycles.

13. The process of claim 12 wherein the capacity is more than 900 mAh/g after 15 of the voltage cycles.

14. The process of claim 12 wherein the capacity is more than 1000 mAh/g after 15 of the voltage cycles.

15. The process of claim 12 wherein the electrode has a current capacity of greater than 80% of the theoretical capacity.

16. The process of claim 12 wherein the battery electrode after a first voltage cycle of the voltage cycles has a coulombic efficiency between charge and discharge portions of one of the voltage cycles of greater than 95%.

17. The process of claim 12 wherein the battery electrode comprises mesoporous spherical carbon domains that are monodisperse with a surface area of more than 1,200 square meters per gram and the particles incorporated into carbon domains are tin oxide, the particles being more than 80 weight percent of the carbon domain-particle incorporated composition.

18. The electrode of claim 11 wherein the particles comprise tin oxide.

19. The electrode of claim 11 wherein the particles of metal if present, comprise tin, cobalt, copper, molybdenum, nickel, iron, ruthenium, or a combination thereof; and the particles of metal oxide, if present, comprise $SnO_2$, CoO, $Co_3O_4$, CuO, $Cu_2O$, $MoO_3$, NiO, FeO, $Fe_2O_3$, $Fe_3O_4$, $RuO_2$, or a combination thereof.

20. The electrode of claim 11 wherein the particles of metal, metal oxide or a combination thereof comprise $SnO_2$.

21. The electrode of claim 11 further comprising lithium intercalated into said particle-incorporated carbon domains.

22. The electrode of claim 11 wherein the mesoporous starburst carbon domains have a surface area greater than 1,500 square meters per gram.

* * * * *